US007725772B2

(12) United States Patent
Proto

(10) Patent No.: US 7,725,772 B2
(45) Date of Patent: May 25, 2010

(54) GENERIC TEMPLATE TO AUTOGENERATE REPORTS FOR SOFTWARE TARGET TESTING

(75) Inventor: Philip J. Proto, Groveland, MA (US)

(73) Assignee: Novell, Inc., Provo, UT (US)

( * ) Notice: Subject to any disclaimer, the term of this patent is extended or adjusted under 35 U.S.C. 154(b) by 427 days.

(21) Appl. No.: 11/879,716

(22) Filed: Jul. 18, 2007

(65) Prior Publication Data

US 2009/0024874 A1      Jan. 22, 2009

(51) Int. Cl.
*G06F 11/00*       (2006.01)
(52) U.S. Cl. ....................................... 714/38
(58) Field of Classification Search ........................ None
See application file for complete search history.

(56) References Cited

U.S. PATENT DOCUMENTS

| | | | |
|---|---|---|---|
| 5,737,518 | A | 4/1998 | Grover et al. |
| 5,909,544 | A | 6/1999 | Anderson, II et al. |
| 6,002,869 | A | 12/1999 | Hinckley |
| 6,263,376 | B1 | 7/2001 | Hatch et al. |
| 6,411,974 | B1 | 6/2002 | Graham et al. |
| 7,526,681 | B2 * | 4/2009 | Anafi et al. ............... 714/38 |
| 2005/0015675 | A1 * | 1/2005 | Kolawa et al. ............ 714/38 |
| 2005/0114834 | A1 | 5/2005 | Richards, Jr. et al. |
| 2006/0048100 | A1 | 3/2006 | Levy et al. |
| 2006/0085681 | A1 | 4/2006 | Feldstein et al. |
| 2006/0230320 | A1 * | 10/2006 | Salvador et al. .......... 714/38 |
| 2006/0248405 | A1 * | 11/2006 | Ponczak et al. .......... 714/38 |
| 2007/0061113 | A1 | 3/2007 | Ding et al. |
| 2007/0061625 | A1 | 3/2007 | Acosta, Jr. et al. |
| 2007/0094541 | A1 | 4/2007 | Kang |

OTHER PUBLICATIONS

Hatcher, Erik and Steve Loughran, Java Development with Ant, 2002, Manning Publications Company, Chapter 4.*
Wikipedia, "JUnit," en.wikipedia.org/wiki/JUnit, Jun. 13, 2007, 2 pps.
JUNIT.ORG, "JUnit.org," www.junit.org/index, Jun. 13, 2007, 2 pps.
IBM, "Introduction to IBM Rational Functional Tester 7.0," www.ibm.com/developerworks/rational/library/06/1205_kelly, Jun. 13, 2007, 5 pps.
Malcom Davis, "Incremental developement with Ant and JUnit," www.ibm.com/developerworks/library/j-ant/, Nov. 1, 2000, 12 pps.

* cited by examiner

*Primary Examiner*—Michael C Maskulinski
(74) *Attorney, Agent, or Firm*—King & Schickli, PLLC

(57) ABSTRACT

Apparatus and methods allow users of software testing applications to obtain auto-generated reports. During use, one or more software test cases of a feature of a software target are identified for execution. A template, common to the software cases, autogenerate a first report in a first computing language, e.g., XML, based on test results obtained from the execution. A transformation into one or more second reports in a second computing language, e.g., HTML, occurs so that users can visually understand the report. Preferred aspects include utilizing an existing Java-based JUnit testing framework and an API of Apache Ant. Retrofitting existing software testing applications contemplates inserting executable code, in the form of a template, to obtain auto-generated reports. Executable code is available as a computer program product in the form of a download or on a computer-readable medium. Overall architecture in a virtual machine is another noteworthy aspect.

19 Claims, 2 Drawing Sheets

GENERIC TEMPLATE TO AUTOGENERATE REPORTS FOR SOFTWARE TARGET TESTING

FIELD OF THE INVENTION

Generally, the present invention relates to computing environments involved in testing software products (e.g., software targets). Particularly, it relates to software testing applications able to autogenerate reports useful to users diagnosing individual test cases of software products. Various features include utilizing existing Java-based JUnit testing frameworks and an API of Apache Ant. Executable code in the form of a template enables convenient usability with multiple cases to be tested. Still other features include computer program products. Overall architecture in a virtual machine is another noteworthy aspect.

BACKGROUND OF THE INVENTION

"Software Testing Applications," such as IBM's Rational Robot as well as the latest product, Functional Tester (RFT) have been known for some time for quality testing software targets, such as web or server applications, stand-alone computing applications, web services, computer program products, GUI interfaces, etc., to name a few. During use, test cases of the software target are written as to examine whether features of the target are operating properly. For example, it may be the situation that a web service providing stock market quotes with a GUI front end has need of determining whether a user fill-in box for stock symbols actually produces a stock quote for the symbol upon submission. In such instance, the software testing application uses code for an individual test case to determine whether the web service works as advertised. Regardless of success, it is important to the user of the software testing application to know and record the results of the test, e.g., whether the test passed, failed, met a predetermined metric, or other. (Of course, an infinite number of test cases per software targets are possible and the foregoing is merely a contextual illustration that skilled artisans will readily understand.)

One well known and open source testing framework, known commonly as JUnit, is another tool in the quality assurance of testing software targets. However, constructing test cases that integrate well with the JUnit framework and automatically generating HTML reports based upon test results can sometimes be cumbersome when using third party test tools, e.g., RFT. As is known, test case construction may involve many classes and methods in a language such as C, C++, or Java and problems exist when trying to integrate the JUnit test case execution followed by a user report generation in an automated fashion.

Another problem with using the JUnit framework to execute test cases requires extending the TestCase class by design. In turn, this may lead to programming issues when trying to modifying a third party test tool class hierarchy. For instance, the third party test tool's class loader may generate, or "throw," exceptions when trying to load the altered class hierarchy.

Still another problem lies with report generation in a format useful for users. Namely, JUnit typically generates reports in an XML format, which is non-visually recognized by users. Converting the XML to a visually useful format, such as HTML, requires several transformation classes. While this may be typically done using an Apache Ant script, which runs as a separate process, launching the Ant script requires still further programming code. In other words, it is not self-executing. Interoperability issues may also exist between Linux- and Windows-brand operating systems, for example.

Accordingly, there is need in the art of software testing applications to easily and conveniently generate user reports that are presented in useful format. There is further need to make the reporting "invisible" relative to the users and software testing applications to minimize inconvenience. It is also important to generate reports quickly and provide appropriate results. In that many users already own and/or use a software testing application, it is further desirable to retrofit existing applications to avoid the costs of providing wholly new products. Taking advantage of existing testing frameworks, such as JUnit, and transformation-of-languages programs, such as Ant, is another feature that would optimizes existing resources. Naturally, any improvements along such lines should further contemplate good engineering practices, such as relative inexpensiveness, stability, ease of implementation, low complexity, flexibility, etc.

SUMMARY OF THE INVENTION

The above-mentioned and other problems become solved by applying the principles and teachings associated with the hereinafter-described generic template to autogenerate reports for software target testing. In a basic sense, users test one or more features of targets with specifically written test case code. A template, common to each of the test cases, utilizes a JUnit testing framework and an Apache Ant API to autogenerate useful user reports heretofore unavailable.

During use, one or more software test cases of a feature of a software target are identified for execution that indicate a pass or failure, for example. The JUnit framework autogenerates a first report in a first computing language, e.g., XML, based on test results obtained from the execution of each of the software cases. By way of the Ant API, a transformation into one or more second reports in a second computing language, e.g., HTML, occurs so that users can visually understand the report.

Retrofitting existing software testing applications contemplates inserting executable code, in the form of a template, to obtain auto-generated reports. Executable code is available as a computer program product in the form of a download or on a computer-readable medium. Overall architecture in a virtual machine is another noteworthy aspect.

In the architecture, the invention embeds an inner class within a main test script class acting as a proxy mechanism. Each method within the inner class calls the corresponding method in the main test script class. Certain of the proxy class tasks include: identifying all test cases, such as obtaining a list of the methods that start with the prefix "test" (required by JUnit as an executable test); using the JUnit framework to execute each method; interfacing with the API of Junit to gather the test result information and create an output file in a first computing language, e.g., XML; interfacing with the Ant API to transform the output file in the first computing language to a second computing language, e.g., transforming the XML to HTML, without Ant scripting; and specifying a location for placing the generated and transformed reports/files.

Certain advantages of the invention include, but are not limited to: unification of the traditional JUnit testing process with autogenerated XML to HTML report transformation; creating a portable class structure transferable into any class; applicability to any third party software testing tool, especially without having to modify class hierarchies; and "hiding" underlying complexities, from users, relating to accessing both the JUnit and Ant frameworks in order to generate useful, standardized HTML user reports. More complex reports would require enhancements to the XSL file provided by the JUnit framework.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus for a generic template to autogenerate reports for software target testing are hereinafter described.

Figure 1:
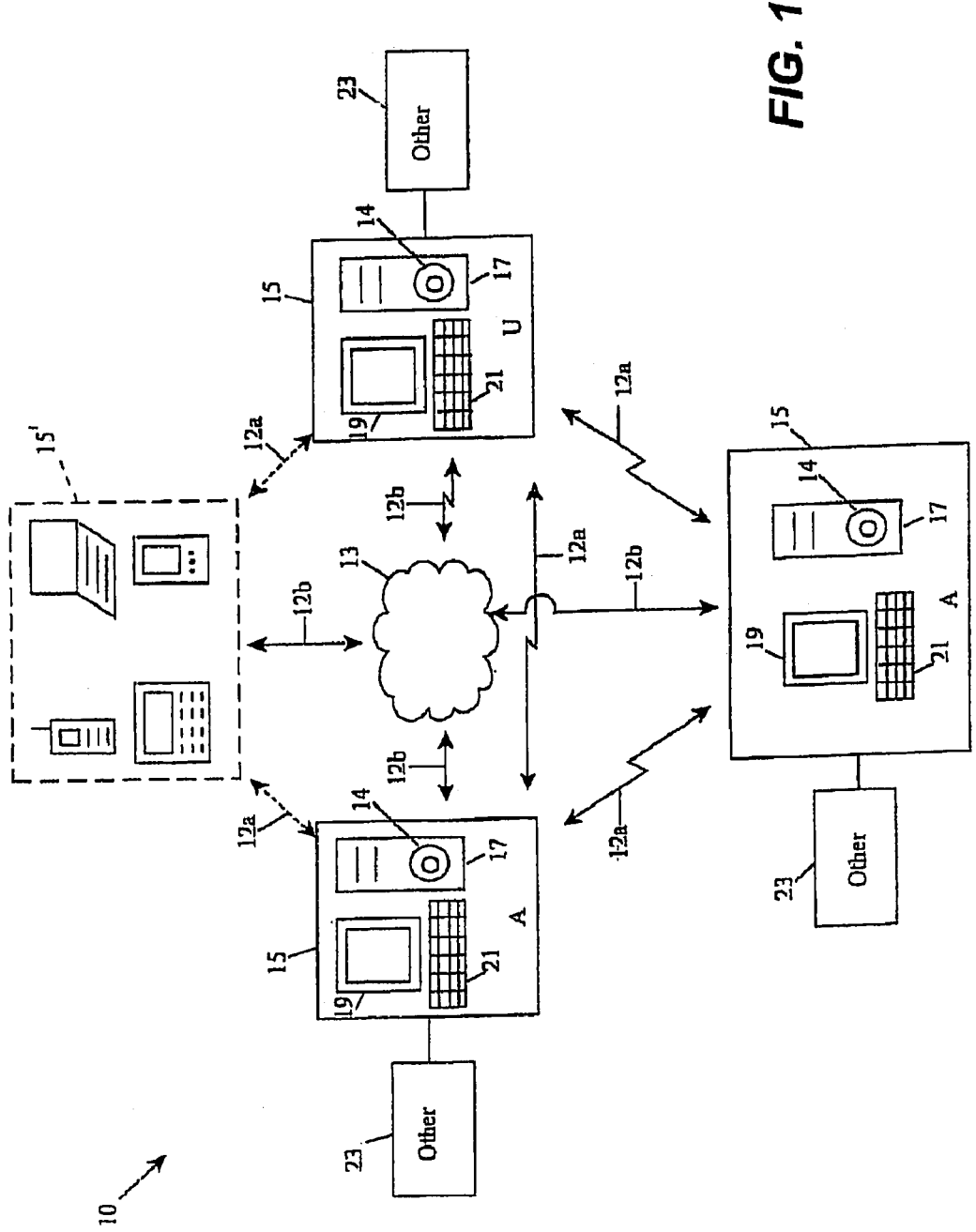
FIG. 1 is a diagrammatic view in accordance with the present invention of a representative computing environment for a generic template to autogenerate reports for software target testing.

With reference to FIG. 1, a representative environment 10 for auto-generating reports consists of one or more computing devices 15 or 15' available per single or multiple instances of a software testing application or a software target to be tested, and/or singularly or collectively arranged as physical and/or virtual machines for the auto-generating of reports. In a traditional sense, an exemplary computing device typifies a server 17, such as a grid or blade server. Alternatively, it includes a general or special purpose computing device in the form of a conventional fixed or mobile computer 17 having an attendant monitor 19 and user interface 21. The computer internally includes a processing unit for a resident operating system, such as DOS, WINDOWS, MACINTOSH, VISTA, UNIX and LINUX, to name a few, a memory, and a bus that couples various internal and external units, e.g., other 23, to one another. Representative other items 23 include, but are not limited to, PDA's, cameras, scanners, printers, microphones, joy sticks, game pads, satellite dishes, hand-held devices, consumer electronics, minicomputers, computer clusters, main frame computers, a message queue, a peer machine, a broadcast antenna, a web server, an AJAX client, a grid-computing node, a peer, a virtual machine, a web service endpoint, a cellular phone or the like. The other items may also be stand alone computing devices 15' in the environment 10 or the computing device itself, upon which the document editor is installed.

In either, storage devices are contemplated and may be remote or local. While the line is not well defined, local storage generally has a relatively quick access time and is used to store frequently accessed data, while remote storage has a much longer access time and is used to store data that is accessed less frequently. The capacity of remote storage is also typically an order of magnitude larger than the capacity of local storage. Regardless, storage is representatively provided for aspects of the invention contemplative of computer executable instructions, e.g., software, as part of computer program products on readable media, e.g., disk 14 for insertion in a drive of computer 17. Computer executable instructions may also be available as a download or reside in hardware, firmware or combinations in any or all of the depicted devices 15 or 15'.

When described in the context of computer program products, it is denoted that items thereof, such as modules, routines, programs, objects, components, data structures, etc., perform particular tasks or implement particular abstract data types within various structures of the computing system which cause a certain function or group of functions. In form, the computer product can be any available media, such as RAM, ROM, EEPROM, CD-ROM, DVD, or other optical disk storage devices, magnetic disk storage devices, floppy disks, or any other medium which can be used to store the items thereof and which can be assessed in the environment.

In network, the computing devices communicate with one another via wired, wireless or combined connections 12 that are either direct 12a or indirect 12b. If direct, they typify connections within physical or network proximity (e.g., intranet). If indirect, they typify connections such as those found with the internet, satellites, radio transmissions, or the like, and are given nebulously as element 13. In this regard, other contemplated items include servers, routers, peer devices, modems, T1 lines, satellites, microwave relays or the like. The connections may also be local area networks (LAN) and/or wide area networks (WAN) that are presented by way of example and not limitation. The topology is also any of a variety, such as ring, star, bridged, cascaded, meshed, or other known or hereinafter invented arrangement.

Figure 2:
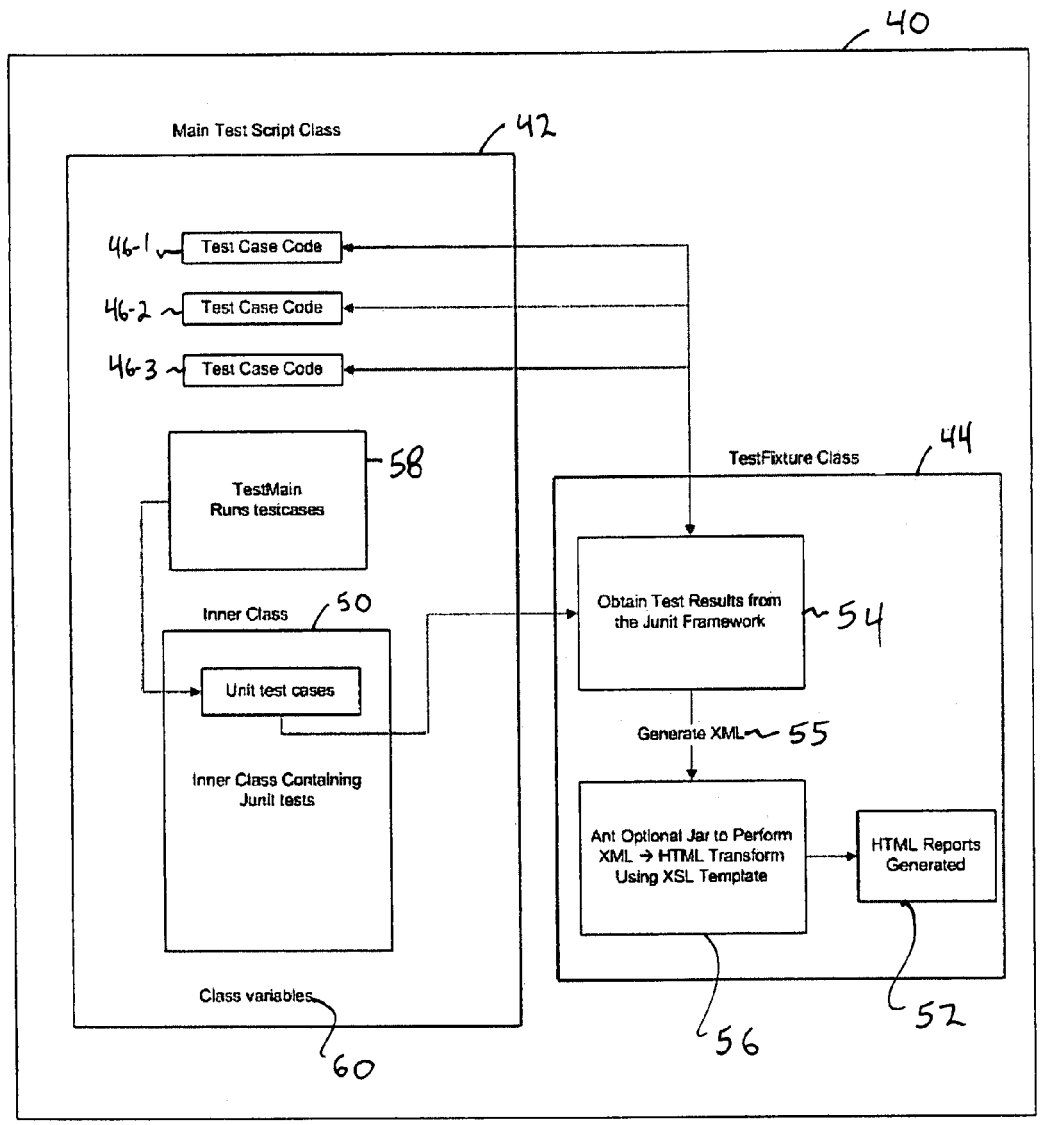
FIG. 2 is a combined diagrammatic architecture and flow chart in accordance with the present invention for auto-generating reports.

With the foregoing representative computing environment as backdrop, FIG. 2 illustrates a high-level organization for auto-generating reports, such as in a virtual machine. Given generally as element 40, the architecture includes a main test script class 42 and a test fixture class 44. Within the main test script class, code in the form of a plurality of test cases (three cases shown, but any number are possible) are given as 46-1, 46-2 and 46-3.

As in the background of the invention section, Software Testing Applications are known for quality testing software targets. The targets are any of a variety of programs or applications and include, representatively, web or server applications, stand-alone computing applications, web services, computer program products, GUI interfaces, etc., to name a few. In turn, the test cases relate to or are associated with the software target and are written to examine whether features of the target are operating properly. In the background section, a stock market web service example was given. In other examples, test cases may typify a response for displaying results upon a user clicking a certain icon or pushbutton of a program. Alternatively, it may represent ascertaining determinations about mouse locations on a computing monitor whereby users navigate or "mouse-over" items. In still others, it may ascertain responses to user inputs. Naturally, an infinite number of test cases per software targets are possible and such is largely dictated by the functionality of the target and its interaction with users, other programs, other websites, etc. The precise embodiment of a test case, therefore, is merely contextual.

In any event, it is important to the user of the software testing application to know and record the results of the test case, such as whether the test passed, failed, met a predetermined metric or other, such as including whether to throw an error message or not. Users can then use the information for purposes of troubleshooting, providing quality assurance reports, developing marketing material, improving the product, or the like. As part of the test fixture class 44, and its interaction with the test case code 46-*x* (by way of an inner class template 50) the reports of the test cases are generated for the users at 52. Representatively, the reports are in an HTML computing language and result from: 1) executing the code of each of the test cases through a JUnit testing framework at 54, which, by its nature, generates reports in an XML computing language at 55; and 2) transforming or converting the generated XML reports to HTML by way of the Apache Ant API at 56. In this regard, the transformation contemplates conversion without resorting to the cumbersomeness of Ant scripting and uses existing functionality of the JUnit framework in the form of its XSL template. All of which, will be described in more detail relative to exemplary executable code of one or more working prototypes of the invention.

The interaction between the test cases 46-*x* and the test fixture class 44 occurs by way of the inner class template 50. In turn, the inner class template is established by the Test Main 58. Namely, an object, such as "TestJunitScriptTest," is named and created according to language, such as m_ScriptTest=new TestJunitScriptTest (this). It is invoked upon language comparable to m_ScriptTest. RunScript ( ). In order to know where to place the reports ultimately established at 52, and/or the reports at 55, executable code of the form m_ScriptTest.setTheReportsDirectory (m_ReportsDirectory) is provided. Thereafter, upon invocation by the Test Main 58, the inner class template is executed. All cases to be tested 46-*x* are executed by way of the JUnit testing framework and the Ant API, while avoiding any Ant scripting. Thereafter, the reports at 55 are generated for users. The test cases are found by all methods beginning with the prefix labeled "test." Using the Java introspection API all test cases beginning with the prefix labeled "test" will be found.

In that other class variables and various initialization(s) need to be present, such is illustrated generically as "class variable" 60.

EXAMPLE

At a high level, the main method (section 4 below) contains additional lines of executable code (the "m_ScriptTest" lines) that create a new instance of an inner class 50. A parameter called the "this" variable is passed to a constructor of the inner class. This object reference instance to the main test script class 42 is saved within the inner class. A single method call is made to set the location of where the reports are to be written and then made (e.g., m_ScriptTest. setTheReportsDirectory (m_ReportsDirectory)). The last step is to execute a line to run the script (e.g., m_ScriptTest. RunScript ( )). This causes a method to be invoked which performs introspection of the inner class instance and obtains a list of all the test case code 46-*x* or methods that begin with the prefix of "test." The inner class 50 located within the main test script class 42 inherits methods from the TestCase, which allows execution of each test case method gathered from within the inner class. Upon method invocation of each test case which acts as the proxy method to the "real" test case code located within the main test script class is then executed. In other words, the a pass-through of sorts exists to the test case code 46-*x* for the ultimate execution thereof. The test case is then run thru or executed by the JUnit framework at 54 to generate the XML results at 55. This XML result file is transformed to HTML at 52 by calling the XSL transform methods located within the Ant API at 56. The HTML result files or reports are stored in the location specified above when the main test script "main" method was invoked.

Administratively, the main test script class will be found hereafter by the name "TestJunitScript" while the inner class will be found by the name "TestJunitScriptTest." Comments in the code will be delineated by // . . . // markings or/** . . . */ markings. The term "RFT" may sometimes be used to identify a third party software testing application.

Section 1. Main Test Script Class (Item 42, FIG. 2)

This is the main class that encompasses the entire test script. This class is free to extend any classes required by either a third party test tool (e.g. a software testing application such as RFT) or user defined classes. No modifications are necessary to the declaration.

Section 2. Main Test Script Variables ("Class Variables" item 60, FIG. 2)

Additional variables are required to "hold" specialized data upon script initialization. Initially, they are set to null.

```
//
// Variables used when creating JUnit reports
private String m_ReportsDirectory = null;
private String m_BuildNumber     = null;
private Object [ ] m_ScriptArgs  = null;
//
// Object instance to class under test
private TestJunitScriptTest m_ScriptTest = null;
```

Section 3. Additional Constructor Added to Main Test Script Class

This is the constructor executed when the Main Test Scrip is created or the class is loaded by the virtual machine. The "m_ReportsDirectory" is where the null setting of Section 2 is switched before executing the JUnit framework begins.

```
/**
 * Additional script constructor
 */
public TestJunitScript( )
{
    super( );
    //
    // Set the build number from the specified utilities class
    m_BuildNumber = getDesignerUtilsRef( ).getBuildNumber( );
    System.out.println("Current  build  number  =  " +
m_BuildNumber);
    //
    // Initialize the target reports directory
    //String targetOS = getDesignerUtilsRef( ).getOS( );
    m_ReportsDirectory = getReportsDirectory(targetOS);
    System.out.println("Reports   directory   =   " +
m_ReportsDirectory);
}
```

Section 4. Script Main Method (Entry Point; Item 58, FIG. 2)

Since the inner class is actually the class passed to JUnit framework in which the test cases were are to be run, a link is needed to the main test class where the actual code or "work"

for the test cases is actually implemented. This is where the additional code in the TestMain method comes into play. The inner class is passed a reference using the "this" pointer to the defined software testing application (e.g., RFT) class instance. This reference is used to "call" the actual methods that do the work from within the proxy inner class being executed by the Junit framework. Once this test case is executed by JUnit a call to the method located within the RFT class is performed. This is where the "script code" should be located. Stated differently, this is the entry point for third party software testing applications.

```
public void testMain(Object[ ] args)
throws TestProgramException
{
  try
  {
    m__ScriptArgs = (Object [ ])args.clone( );
    //
    // Run the test script thru the JUnit framework.
    // Test cases are not guaranteed to be executed in a
         // particular order since they are obtained by
introspection.
         // If test case order of execution is required, initialize
         // a String [ ] array with the test case method names.
         // The runScript method is overloaded and will accept the
         // //string array.
         m__ScriptTest = new TestJunitScriptTest(this);
         m__ScriptTest.setTheReportsDirectory(m__ReportsDirectory);
         m__ScriptTest.setTheBuildNumber(m__BuildNumber);
         m__ScriptTest.runScript( );
  }
  catch(TestProgramException tpe)
  {
         //
         // Log the error in RFT log
         logError(tpe.getMessage( ) );
         throw new TestProgramException(tpe.getMessage( ));
  }
}
```

Section 5. Inner Class Template (Item 50, FIG. 2)

The inner class provides both a proxy and a link to the JUnit framework. Skilled artisans will note that this proxy class inserts itself into the hierarchy which eventually extends the TestCase class required by JUnit.

```
/**
 * Standard fixture class that uses JUnit to run each testcase
 * and create a report using the ANT API.
 * The TestFixture class contains all methods to run the
 * JUnit testcases, collect the results, write out the xml result
 * document, and transform the xml data file to Html reports.
 */
public static class TestJunitScriptTest extends RFTTestFixture
{
        /**
         * The following JUnit test case a sample template.
         */
        public void testMySampleTestCase( )
        {
        try { m__ScriptPtr.mySampleTestCase( ); }
        catch(TestProgramException tpe) { fail(tpe.getMessage( )); }
        }
        /**
         * Default Constructor
         * @param None
         */
        public TestJunitScriptTest( ) {       super( ); }
        /**
         * Constructor that has a object instance pointer from
         * the parent class. This ptr is used to access the parent
```

-continued

```
         * class methods.
         * @param Ojbect instance ptr to the parent class.
         */
        public TestJunitScriptTest(TestJunitScript __scriptPtr)
        {
            super( );
            m__ScriptPtr = __scriptPtr;
        }
        /**
         * Method executed by JUnit before the test cases are run.
         * Used to initialize any data that the test cases may require
         */
        protected void setUp( ) throws Exception { }
        /**
         * Method executed by JUnit after the test cases are run.
         * Used to clean up any data or connections.
         */
        protected void tearDown( ) throws Exception { }
        /**
         * Static JUnit method used to add the supplied class as
         * a parameter to the TestSuite constructor.
         */
        public static Test suite( )
        {
            return new TestSuite(TestJunitScriptTest.class);
        }
    //
    // Variable declarations
    private TestJunitScript m__ScriptPtr = null;
}
```

Section 6. Test Tool Level Proxy Class (RFTTestFixture Class, Item 44, FIG. 2)

This class provides the last level of abstraction via the client side public API. This class provides the wrapper mechanism that integrates into the JUnit and Ant framework. This code exists in the provided library jar item 56, FIG. 2 in which the user does not have access to from the client source (nor do they likely desire to have access to). The "public void runScript( ) throws TestProgramException" method begins the running of the testing of cases through the JUnit framework. The "for" loop (e.g., "for (int index=0; index <m__TestCaseNames.length; index++)") identifies and executes all the test cases through the Junit framework before generating the first of the XML reports.

```
public class RFTTestFixture extends TestFixture
{
        /**
         * Method to get the current directory string stored in the class
         *
         * @return Returns a string of the currently active reports directory.
         */
        public String getTheReportsDirectory( ) { }
        /**
         * Method to set the directory string
         *
         * @param Base report directory used to write JUnit reports to.
         */
        public void setTheReportsDirectory(String __reportsBaseDir) { }
        /**
         *Method to get the currently active build number
         *
         * @return String representing the stored build number
         */
        public String getTheBuildNumber( ) { }
        /**
         *Method to set the build number
         *
         *@param String representing the build number
         */
```

-continued
```
    public void setTheBuildNumber(String _buildNumber) { }
    /**
     *
     * Method that will execute JUnits test runner class.
     * The runner class will
     * run the class specified by the new TestSuite parameter.
     *
     * @param none
     * @return void
     * @throws TestProgramException
     */
    public void runScript( ) throws TestProgramException
    {
        writeMessage("Starting JUnit test(s).");
        //
        // Set report output params to be used by the JUnit API
        super.setTheReportsDirectory(getTheReportsDirectory( ));
        super.setTheBuildNumber(getTheBuildNumber( ));
        super.setTestToolType(getTheAutomationToolType( ));
        //
        // Run thru all the junit test cases
        for (int index = 0; index < m_TestCaseNames.length; index++)
        {
            runTest(m_TestCaseNames[index]);
            //
            // If there is an error while JUnit is running the test,
            // try getting it from the TestFixture and log it.
            String testErrorMsg =
            getJUnitTestResultErrorMessage(index);
            if(testErrorMsg != null)
            {
                RationalTestScript.logError("Step : " + testErrorMsg);
            }
        }
        //
        // Generate JUnit xml results + reports only if there
        // are test cases to run.
        if (m_TestCaseNames.length == 0)
            writeMessage("---No JUnit testcases found.---");
        else
        {
            generateJUnitXMLResults( );
            generateJUnitReports( );
        }
```

((Note: this is where the Ant API is accessed to perform conversion from XML to HTML—the code will be provided after the EXAMPLE.))

```
        writeMessage("Ending JUnit test(s).");
    }
    /**
     * Method that will execute JUnits test runner class.
     * The runner class will run the class specified
     *by the new TestSuite parameter.
     *
     * @param Array of test case names
     * @return void
     * @throws TestProgramException
     */
    public void runScript(String[ ] _testCaseNames) throws
    TestProgramException { }
}
```

Section 7. Proxy Class Encapsulating the JUnit Framework

```
public class TestFixture extends TestCase
implements XMLConstants
{
    public String getTheBuildNumber( ) { return m_BuildNumber; }
```

-continued
```
    public void setTheBuildNumber(String _bldNum) { }
    public String getTheReportsDirectory( ) {
    return m_ReportsDirectory; }
    public void setTheReportsDirectory(String _targetReportsDir)
    throws TestProgramException { }
    public int getTestToolType( ) { return m_TestToolType; }
    public void setTestToolType(int _type) {
    m_TestToolType = _type; }
    public void runTest(String testName)
    throws TestProgramException
    {
        setTestName(testName);
        //
        // Start clock
        long startTime = System.currentTimeMillis( );
        //
        // Start the test
        // Create and add XML Element for this test
        Element currentTest = doc.createElement(TESTCASE);
        currentTest.setAttribute(ATTR_NAME, testName);
        rootElement.appendChild(currentTest);
        //
        // Sets the name of the test case with Junit API
        setName(testName);
        //
        // Run the test thru JUnit framework
        TestResult result = new TestResult( );
        this.run(result);
    }
}
```

Section 8. Main Script Test Case Code (Item 46-x, FIG. 2)

```
public class TestJunitScript
{
    /**
     * Method is a sample test case template.
     */
    public void mySampleTestCase( )
    throws TestProgramException
    {
        //
        // TODO
        // Insert code here to do work against target application
        // This code can drive any type of target, gui, web, or server
        // based application.
        // This method will be called if defined within the inner test
        // fixture class and run thru the Junit framework.
    }
}
```

END EXAMPLE

Appreciating additional code is necessary to illustrate 1) the exposure to the Ant API to perform the actual conversion of XML to HTML, such as from 55 to 52, by way of 56 (FIG. 2) and 2) the Test Fixture Class 44, the following is representative:

Conversion of XML to HTML Example

```
// ---------------------------------------------------------------------
//
//     XMLToHTMLTransform.java
//
//     Copyright © 2005, Novell, Inc., All Rights Reserved
//     Written by Phil Proto
//
```

-continued

```
// ------------------------------------------------------------
package com.novell.test.autoscript.xwb.junit.framework;
import java.io.*;
import java.util.StringTokenizer;
import java.util.Vector;
import org.apache.tools.ant.BuildException;
import org.apache.tools.ant.util.DOMElementWriter;
import org.apache.tools.ant.taskdefs.optional.junit.XMLResultAggregator;
import org.apache.tools.ant.types.selectors.FilenameSelector;
import org.apache.tools.ant.types.FileSet;
import org.apache.tools.ant.Project;
/                                                                             /
=================================================================
===============
public class XMLToHTMLTransform
{
   public XMLToHTMLTransform( ) { }
   public static void main(String [ ] args)
   {
      // make sure there's an arg
      if (args.length < 2)
      {
         usage( );
         System.exit(1);
      }
      //
      // Make sure directory exists
      if (!new File(args[0]).exists( ))
      {
         System.out.println("The location, " + args[0] + ", does not exist");
         usage( );
      }
      //
      // Transform xml->html reports
      XMLToHTMLTransform transform = new
      XMLToHTMLTransform( );
      try
      {
         transform.run(args[0], args[1]);
      }
      catch (Exception e)
      {
         e.printStackTrace( );
      }
   }
   public void run(String targetDir, String sourceXMLFiles)
   throws Exception
   {
      File f = new File(targetDir);
      FileSet fs = new FileSet( );
      fs.setDir(f);
      FilenameSelector fns = new FilenameSelector( );
      fns.setName(sourceXMLFiles);
      fs.addFilename(fns);
      XMLResultAggregator xmlra = new XMLResultAggregator( );
      Project prj = new Project( );
      prj.setBaseDir(f);
      xmlra.setProject(prj);
      xmlra.addFileSet(fs);
      xmlra.setTodir(f);
      xmlra.createReport( );
      try
      {
         xmlra.execute( );
      }
      catch (BuildException be)
      {
         System.out.println(be.getMessage( ));
         System.exit(1);
      }
   }
   private static void usage( )
   {
      System.out.println("Usage: java " +
      "com.novell.test.autoscript.xwb.junit.framework.-
      XMLToHTMLTransform" +
         " <target directory> <xml source files>");
   }
}
```

End Conversion of XML to HTML Example

Test Fixture Class Example

End Test Fixture Class Example

Prototype Example for Third Party Testing Tool

The following template was developed for our third party test tool which embeds the necessary code within any named test script. When a script is created via the third party test tool the name given to the script would be substituted where necessary. This will enable any user creating a test script with a sample test case to be generated. This template frees the user to add code to test the target via the sample test case or adding any new ones using the mySampleTestCase method as a guide.

```
%script:packageDeclaration%
import %helper:fullName%;
import com.rational.test.ft.*;
import com.rational.test.ft.object.interfaces.*;
import com.rational.test.ft.script.*;
import com.rational.test.ft.value.*;
import com.rational.test.ft.vp.*;
import junit.framework.Test;
import junit.framework.TestSuite;
import junit.framework.Assert;
import com.novell.test.automator.framework.TestProgramException;
import com.novell.test.autoscript.xwb.junit.framework.RFTTestFixture;
import com.novell.qa.fw.*;
/**
 * TODO:Brief description. This line becomes the description in the
 class list (like a table of contents).
 *
 *
 * <h2>Detailed Description:</h2>
 *
 * <p>TODO: Enter a detailed description of the test here.
 *
 * <h2>Manual Execution steps:</h2>
 * <ol>
 *          <li>TODO:Do this first.</li>
 *          <li>Now do this.</li>
 *          <li>This is the time to do this.</li>
 *</ol>
 *
 * <h2>Verification Points:</h2>
 *
 *       <ol>
 *          <li>TODO: Comments concerning vps. Maybe what the
 point is looking for.</li>
 *       </ol>
 *
 * <h2>Known issues</h2>
 *
 * <ul>
 *          <li>TODO:Open script issue 1.</li>
 *          <li>Open script issue 2.</li>
 *          <li>Open script issue 3.</li>
 * </ul>
 *
 * <h2>Dependencies</h2>
 *
 * <ul>
 *          <li>TODO:Dependency 1.</li>
 * </ul>
 *
 * <p><b>Product:</b> TODO:XYZWidget Calculator v0.3</b>
 * <br><b>PRD Reference: none</b>
 * <br><b>Created:</b> %date% %time%
 *    <br><b>Original  Host:</b>
 %static:com.rational.test.ft.sys.OperatingSystem.getVersion%
```

```
 *
 * * @since %date:yyyy/MM/dd%
 * @author %system:user.name%
 *
 */
public class %script:name% extends %helper:name%
{
    /**
     * Method is a sample test case template.
     */
    public void mySampleTestCase( )
    throws TestProgramException
    {
        %script:insertBefore% this entire line will be deleted during initial script generation
    }
    /**
     * Entry point for RFT class loader
     * @param Object array used to pass arguments from callScript method
     */
    public void testMain(Object[ ] args)
    throws TestProgramException
    {
        try
        {
            m_ScriptArgs = (Object [ ])args.clone( );
            //
            // Run the test script thru the JUnit framework.
            // Test cases are not guaranteed to be executed in a
            // particular order since they are obtained by introspection.
            // If test case order of execution is required, initialize
            // a String [ ] array with the test case method names.
            // The runScript method is overloaded and will accept the string array.
            m_ScriptTest = new %script:name%Test(this);
            m_ScriptTest.setTheReportsDirectory(m_ReportsDirectory);
            m_ScriptTest.setTheBuildNumber(m_BuildNumber);
            m_ScriptTest.runScript( );
        }
        catch(TestProgramException tpe)
        {
            //
            // Log the error in RFT log
            logError(tpe.getMessage( ) );
            throw new TestProgramException(tpe.getMessage( ));
        }
    }
    /**
     * Standard fixture class that uses JUnit to run each testcase
     * and create a report using the ANT API.
     * The TestFixture class contains all methods to run the
     * JUnit testcases, collect the results, write out the xml result
     * document, and transform the xml data file to Html reports.
     */
    public static class %script:name%Test extends RFTTestFixture
    {
        /**
         * The following JUnit test case a sample template.
         */
        public void testMySampleTestCase( )
        {
            try { m_ScriptPtr.mySampleTestCase( ); }
            catch(TestProgramException tpe) { fail(tpe.getMessage( )); }
        }
        /**
         * Default Constructor
         * @param None
         */
        public %script:name%Test( ) {    super( ); }
        /**
         * Constructor that has a object instance pointer from
         * the parent class. This ptr is used to access the parent
         * class methods.
         * @param Ojbect instance ptr to the parent class.
         */
        public %script:name%Test(%script:name% _scriptPtr)
        {
            super( );
            m_ScriptPtr = _scriptPtr;
        }
        /**
         * Method executed by JUnit before the test cases are run.
         * Used to initialize any data that the test cases may require
         */
        protected void setUp( ) throws Exception { }
        /**
         * Method executed by JUnit after the test cases are run.
         * Used to clean up any data or connections.
         */
        protected void tearDown( ) throws Exception { }
        /**
         * Static JUnit method used to add the supplied class as
         * a parameter to the TestSuite constructor.
         */
        public static Test suite( )
        {
            return new TestSuite(%script:name%Test.class);
        }
        //
        // Variable declarations
        private %script:name% m_ScriptPtr = null;
    }
    /**
     * Default script constructor
     */
    public %script:name%( )
    {
        super( );
        //
        // Set the build number from the specified utilities class
        m_BuildNumber = getDesignerUtilsRef( ).getBuildNumber( );
        System.out.println("Current build number = " + m_BuildNumber);
        //
        // Initialize the reports directory
        String targetOS = getDesignerUtilsRef( ).getOS( );
        m_ReportsDirectory = getReportsDirectory(targetOS);
        System.out.println("Reports directory = " + m_ReportsDirectory);
    }
    //
    // Variables used when creating JUnit reports
    private String m_ReportsDirectory = null;
    private String m_BuildNumber    = null;
    private Object [ ] m_ScriptArgs    = null;
    //
    // Object instance to class under test
    private %script:name%Test m_ScriptTest = null;
}
```

End Prototype Example

Certain advantages of the invention over the prior art should now be readily apparent. For example, there is now provided a software testing application that easily and conveniently generates user reports in a useful format. There is also a hidden aspect of the functionality making the application convenient to users. Retrofitting to existing software testing applications also exists as does taking advantage of existing testing frameworks, such as JUnit and Ant. Of course, these are only a few of the many advantages of the invention and skilled artisans will immediately recognize others.

Finally, one of ordinary skill in the art will recognize that additional embodiments are also possible without departing from the teachings of the present invention. This detailed description, and particularly the specific details of the exemplary embodiments disclosed herein, is given primarily for clarity of understanding, and no unnecessary limitations are to be implied, for modifications will become obvious to those skilled in the art upon reading this disclosure and may be made without departing from the spirit or scope of the invention. Relatively apparent modifications, of course, include combining the various features of one or more figures with the features of one or more of other figures or expanding the system to replicate the embodiments multiple times.

The invention claimed is:

1. In a software testing application, a method of auto-generating reports for testing one or more software targets, comprising:

associated with each of the one or more software targets, identifying all software cases to be tested;

executing the identified software cases by way of a template common to the identified software cases, including utilizing a JUnit testing framework and an Ant API, the utilizing avoiding any Ant scripting;

obtaining testing results for the identified software cases having been executed; and thereafter, auto-generating a report for users of the software testing application including generating a first report in a first computing language for each of the identified software cases and transforming each of the first reports into one or more second reports in a second computing language different from the first computing language, the transforming occurring after the generating the first report for all of the identified software cases.

2. The method of claim 1, further including specifying a location for delivering the transformed one or more second reports.

3. The method of claim 1, wherein the transforming further includes calling XSL transforming methods located with the Ant API.

4. In a software testing application, a method of auto-generating reports for users testing one or more software targets, comprising:

invoking an inner class template of executable code including, identifying all software cases to be tested per each said one or more software targets;

executing each of the identified software cases by utilizing a JUnit testing framework and an Ant API, the utilizing avoiding any Ant scripting; and thereafter, auto-generating a report for users of the software testing application including generating a first report in an XML computing language for each of the identified software cases and transforming each of the XML reports into one or more second reports in an HTML computing language, the transforming occurring after the generating the XML reports for all of the identified software cases.

5. The method of claim 4, wherein the identifying all software cases to be tested further includes finding all prefixes labeled as a test.

6. The method of claim 5, further including determining whether all the prefixes labeled as said test have been executed before the generating the first reports.

7. The method of claim 4, further including specifying a location for sending the transformed second reports.

8. The method of claim 4, wherein a proxy class loads the inner class template of executable code before the invoking.

9. The method of claim 4, further including providing a test fixture class and a main test script class, the main test script class defining the inner class template and the test fixture class defining the generating the first reports and the transforming.

10. The method of claim 9, wherein the identified all software cases to be tested exist in the main test script class, the inner class template being common to each said identified all software cases to be tested.

11. A software testing application in the form of a computer program product available as a download or on a computer readable media for installation as a process of a virtual machine on one or more computing devices, the software testing application for testing one or more software targets, comprising:

a first component for identifying all software cases to be tested associated with each of the one or more software targets;

a second component, different or same as the first component, for executing the identified software cases by way of a template common to the identified software cases;

a third component, different or same as the first or second components, for obtaining testing results for the identified software cases having been executed; and a fourth component, different or same as the first, second or third components, for thereafter auto-generating a report for users of the software testing application including generating a first report in a first computing language for each of the identified software cases and transforming each of the first reports into one or more second reports in a second computing language different from the first computing language, the transforming occurring after the generating the first report for all of the identified software cases;

wherein at least one of the components is a JUnit testing framework and an Ant API avoiding Ant scripting.

12. The computer program product of claim 11, wherein at least one of the components is a main test script class.

13. The computer program product of claim 11, wherein at least one of the components is an inner class template.

14. A computer program product having a data structure available as a download or on a computer-readable medium, the data structure for insertion as a template into an existing software testing application on one or more computing devices to autogenerate user reports, comprising:

a first data field containing data representing an interaction with the software testing application to identify all software test case code;

a second data field containing data representing a JUnit testing framework and an Ant API, the identified software test case code to be executed through the JUnit testing framework;

a third data field containing data representing the auto-generation of XML reports by way of the Ant API based on testing results for the identified software cases having been executed; and a fourth data field containing data representing the transformation of the XML reports into another computing language for users, wherein said fourth data field avoids all Ant scripting language.

15. The computer program product of claim 14, wherein the fourth data field contains data representing the transformation of the XML reports only after the generation of the XML reports has occurred for all of the identified software test case code.

16. The computer program product of claim 14, wherein at least one of the first, second, third or fourth data fields represents the template as insertable into a main test script class, the template being common to each said identified software test case code also in the main test script class.

17. A method of using a software testing application for testing one or more software targets, comprising:

providing an existing software testing application having no auto-generation of report capability per one or more software cases to be tested; and adding a template of executable code to the existing software testing application on one or more computing devices to autogenerate user reports for at least one of the software cases to be tested, wherein the template includes a JUnit testing framework and an Ant API avoiding Ant scripting.

18. The method of claim 17, further including executing the at least one of the software cases to be tested and reporting to a user.

19. The method of claim 17, further including auto-generating a first report in an XML computing language for the at least one of the software cases to be tested and transforming the first report into one or more second reports in an HTML computing language.

* * * * *